Patented July 19, 1927.

1,636,596

UNITED STATES PATENT OFFICE.

CARLETON ELLIS, OF MONTCLAIR, NEW JERSEY.

PROCESS OF MAKING SULPHUR PHENOL RESIN.

No Drawing.　　　Application filed December 30, 1922. Serial No. 610,042.

The present invention relates to the production of a resinous material from sulphur and a phenolic body. Hydrogen sulphide is produced and if desired can be utilized after suitable purification if desired.

In addition to phenol and cresol various higher phenols may be employed as for example tar acids which is a crude distillate containing cresol and higher homologues. The tar acids or cresols from the low temperature distillation or carbonization of coal also may be employed.

In carrying out the process it is desirable to heat the reaction mixture at temperatures not much below 150° C. and preferably not greatly exceeding 200° C. although higher temperatures may be used in some cases where a dark colored resin is not objectionable. Ordinarily however a resin of as light a color as possible is desired and in such case a temperature of 165-175° C. may be used. Below 150° C. the reaction progresses slowly with inadequate combination of sulphur to form a product containing a high percentage of sulphur. Since sulphur is considerably cheaper than the phenolic bodies employed it may be combined to advantage to as large an extent as possible. By such combination a larger yield of hydrogen sulphide also is obtained. In general the heating should be carried out at a temperature approaching the boiling point of ordinary phenol. A mixture of phenol and sulphur and catalyst may be heated quickly to for example 165° C. and maintained at that point until the phenol has largely united with the sulphur to form a product boiling at a temperature above that of phenol. On further heating of this sulphured compound in the presence of sulphur, combination takes place at still higher temperatures for example 180-190° C. In case any free phenol is present it will distil at this temperature, and be removed leaving a resin which on cooling solidifies to a hard product.

As the solubility of various resins made in this manner decreases with increasing amount of sulphur entering into combination it is desirable when the resin is to be used as a binder in plastic molding to incorporate the resin with the usual fillers by mixing on hot milling rolls similar to those used in making rubber compounds. Thus various fillers such as asbestos, wood flour, mineral powders, coloring agents and paraffin wax, stearic acid or other mold lubricant may be incorporated. The addition of paraform or trioxymethylene in the presence of a small amount of caustic alkali may be utilized to afford on hot pressing a harder, firmer product. Hexamethylenetetramine likewise may be employed in an amount up to 5 or 10 per cent based on the weight of the resinous material.

Suitable catalysts which may be introduced into the reaction mixture are basic substances such as caustic soda or potassium carbonate, various other catalytic bodies preferably of a basic character likewise may be employed. The use of a small amount of catalyst causes the reaction to progress rather slowly and a larger proportion is frequently desirable and in fact often necessary in preparing resins containing a high content of combined sulphur. In producing resins from certain of the cresols a higher content of catalyst is desirable. When the catalyst is used in large proportion it is advisable to subsequently remove it by washing, neutralization or by other means. Mixtures in the proportion of 50 parts phenol to 80 or 100 parts of sulphur and 1 part of caustic soda, proportions being given by weight, may be used. This corresponds to one molecule of phenol to about 4.5 to 6 atoms of sulphur with somewhat less than 1% of caustic soda. The caustic soda may be added in aqueous or alcoholic solution to the phenol to form sodium phenate and when the latter is heated the alcohol or water depart during the early stages of the operation. Sodium phenate constitutes an effective catalyst and the proportion in the batch may be increased to a considerable extent to advantage, for example by using 10 parts of caustic soda to 50 parts of phenol and 80 to 100 parts of sulphur. Similar proportions may be used in the case of cresol and other phenolic bodies. During the heating operation the sodium phenate apparently breaks down quite readily to form resinous substances. When the proportion of caustic soda is sufficient to convert from one-fourth to one-half of the phenol into the phenate a high proportion of sulphur may be used and the reaction takes place rather quickly so that the generation of hydrogen sulphide is rapid. Sometimes rapid evolution of hydrogen sulphide is of importance portance in producing certain sulphides or sulphureted organic compounds which undergo change on exposure during a protracted treatment with the gas.

Using proportionately small amounts of catalyst warrant a low percentage of sulphur the reaction yielding a resin may take from 10 or 12 hours up to several days to become complete. By using a large proportion of both sulphur and catalyst a much more rapid action is secured. For example 50 parts by weight of what is known in commerce as 97–99% tar acids (which consist of cresols and homologues) was heated with 120 parts sulphur and 10 parts caustic soda to 180° C. Much foaming occurred and at the end of about 2 hours a sample withdrawn solidified quickly to a hard brittle resinous substance. Further heating increased the degree of combination. On pulverizing a resin of this character and washing with acidulated water practically all of the catalyst is removed. On the other hand if an aqueous solution of the resin is desired for impregnation purposes additional caustic alkali may be added and the resin put into solution and thereafter used for coating or impregnating purposes as may be desired.

What I claim is:—

1. A process of making a resinous product which comprises heating a mixture containing substantially more than three atoms of sulphur, with one molecule of a phenolic body and an alkaline catalyst, to a temperature of at least 165° C.

2. A process of making a resinous product which comprises heating a mixture containing at least 8 parts of sulphur to 5 parts of phenol, and a small amount of an alkali as catalyst, to a temperature of at least 165° C.

3. A process of making a resinous product which comprises heating a mixture containing sulphur, a phenolic body and an alkaline material to a temperature of at least 165° C., the amount of the sulphur representing at least 4.5 atoms of sulphur to 1 molecule of the phenolic body.

4. A process of making a resinous product which comprises heating a mixture containing sulphur, a phenolic body and an alkaline material, to substantially over 150° C., the amount of the sulphur being about 4.5 to 6 atoms of sulphur to 1 molecule of the phenolic body.

5. A process of making a resinous product which comprises heating a mixture containing sulphur, a phenolic body and an alkaline material to between 165 and 175° C.

6. A process of making a resinous substance which comprises heating a phenolic body, sulphur and a catalyst to about 165° C. the ratio of phenolic body to sulphur being about 1 molecule of the former to about 4.5 to 6 atoms of the latter.

7. The process of making a resin which comprises heating a phenolic body with sulphur and a basic catalyst in the proportions of about 1 molecule of phenol to at least about 4.5 atoms of sulphur, to a temperature between 150 and 200° C.

8. A process of making a purified resinous substance which comprises heating one molecular equivalent of a phenolic body with not substantially less than 4.5 atomic equivalents of sulphur, and an alkaline catalyst, to a temperature of between about 165 and 175° C.

CARLETON ELLIS.